United States Patent
Kuki et al.

Patent Number: 5,168,566
Date of Patent: Dec. 1, 1992

[54] MULTI-TASK CONTROL DEVICE FOR CENTRAL PROCESSOR TASK EXECUTION CONTROL PROVIDED AS A PERIPHERAL DEVICE AND CAPABLE OF PRIORITIZING AND TIMESHARING THE TASKS

[75] Inventors: Masaru Kuki, Osaka; Toshimitsu Nakade, Nabari; Hirotake Hayashi, Tenri; Takaaki Uno, Nara, all of Japan

[73] Assignee: Sharp Kabushiki Kaisha, Osaka, Japan

[21] Appl. No.: 825,334

[22] Filed: Jan. 27, 1992

Related U.S. Application Data

[63] Continuation of Ser. No. 751,665, Aug. 23, 1991, abandoned, which is a continuation of Ser. No. 674,035, Nov. 23, 1984, abandoned.

[30] Foreign Application Priority Data

Nov. 25, 1983 [JP] Japan ................. 58-222949

[51] Int. Cl.⁵ ............................................ G06F 13/12
[52] U.S. Cl. .............................. 395/650; 364/281.7; 364/241.2
[58] Field of Search .......................................... 395/650

[56] References Cited

U.S. PATENT DOCUMENTS

| | | | |
|---|---|---|---|
| 4,145,735 | 3/1979 | Soga | 364/200 |
| 4,152,761 | 5/1979 | Louie | 364/200 |
| 4,183,083 | 1/1980 | Chatfield | 364/200 |
| 4,384,324 | 5/1983 | Kim et al. | 364/200 |
| 4,385,382 | 5/1983 | Goss et al. | 364/200 |
| 4,414,624 | 11/1983 | Summer et al. | 364/200 |
| 4,435,780 | 3/1984 | Herrington et al. | 364/900 |
| 4,455,602 | 6/1984 | Baxter et al. | 364/200 |
| 4,455,621 | 6/1984 | Pelley et al. | 364/900 |
| 4,484,302 | 11/1984 | Cason et al. | 364/900 |
| 4,504,906 | 3/1985 | Itaya et al. | 364/200 |
| 4,562,535 | 12/1985 | Vincent et al. | 364/200 |
| 4,562,538 | 12/1985 | Berenbaum et al. | 364/200 |
| 4,598,384 | 7/1986 | Shaw | 364/521 |
| 4,653,020 | 3/1987 | Cheselka et al. | 364/521 |

OTHER PUBLICATIONS

Silicon Operating System Standardizes Software; C. McMinn et al.; Sep. 8, 1981; pp. 135-139.
Real-Time Operating System Puts Its Executive on Silicon; John Tinnon; Apr. 21, 1982; pp. 137-140.

Primary Examiner—Lawrence E. Anderson

[57] ABSTRACT

A computer peripheral device incorporating a multi-task control device which is extremely useful for such programs controlling the microcomputer system. In particular, the multi-task control device effectively controls a plurality of tasks executed by the CPU by using means other than the CPU including such means for controlling operations needed for comparing priority orders between a plurality of tasks, and the other means for generating interrupt operations from this control device against the CPU needed for switching tasks being executed in accordance with the result of the priority comparative operations.

3 Claims, 14 Drawing Sheets

| COMMAND NUMBER | COMMAND NAME | FUNCTION | INPUT PARAMETER | OUTPUT PARAMETER |
|---|---|---|---|---|
| 0 | INIT | INITIALIZE MTSP | 1. TOTAL NUMBER OF TASK | |
| 1 | TSTR | COMPLETE MTSP INITIALIZATION AND START EXECUTION OF TASKS | | |
| 2 | TCRT | GENERATE TASKS | 1. TASK'S NUMBER<br>2. PRIORITY<br>3. SP (UPPER BYTE)<br>4. SP (LOWER BYTE) | |
| 3 | TDEL | ERASE TASKS | 1. TASK'S NUMBER | |
| 4 | TRSM | REACTIVATE TASKS | 1. TASK'S NUMBER | |
| 5 | TSPD | SUSPEND TASKS | 1. TASK'S NUMBER<br>2. CONTROL SWITCH | |
| 6 | TPRI | CHANGE PRIORITY AGAINST TASKS | 1. TASK'S NUMBER<br>2. CHANGED PRIORITY | |
| 7 | TSLI | SET TIME-SHARING PROCESS FOR TASK | 1. PRIORITY ORDER<br>2. TIME BASE<br>3. COUNT NUMBER | |
| 8 | CSET | SET TIME | 1. HOUR<br>2. MINUTE<br>3. SECOND | |
| 9 | CGET | READ CLOCK | | 1. HOUR<br>2. MINUTE<br>3. SECOND |
| 10 | MALC | OCCUPY MEMORY | 1. NUMBER OF REQUESTED MEMORY BLOCK | 1. OCCUPIED MEMORY ADDRESS |
| 11 | MREL | RELEASE MEMORY | | |
| 12 | POST | TRANSMIT MESSAGE | 1. MAIL BOX NO.<br>2. MESSAGE DATA 1<br>3. MESSAGE DATA 2<br>4. MESSAGE DATA 3<br>5. MESSAGE DATA 4 | |
| 13 | PEND | RECEIVE MESSAGE | 1. MAIL BOX NO. | 1. MESSAGE DATA 1<br>2. MESSAGE DATA 2<br>3. MESSAGE DATA 3<br>4. MESSAGE DATA 4 |
| 14 | PMOD | SET PORT MODE | 1. PORT MODE 1<br>2. PORT MODE 2<br>3. PORT MODE 3 | |

FIG. 5

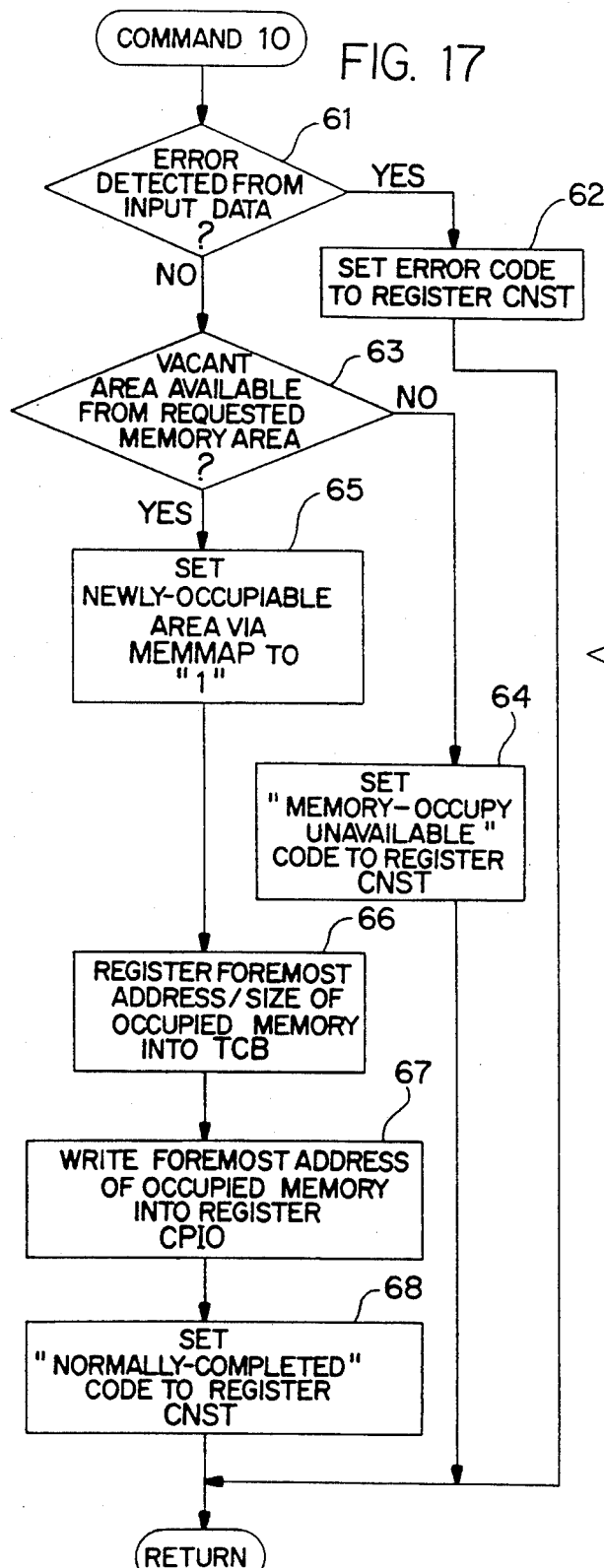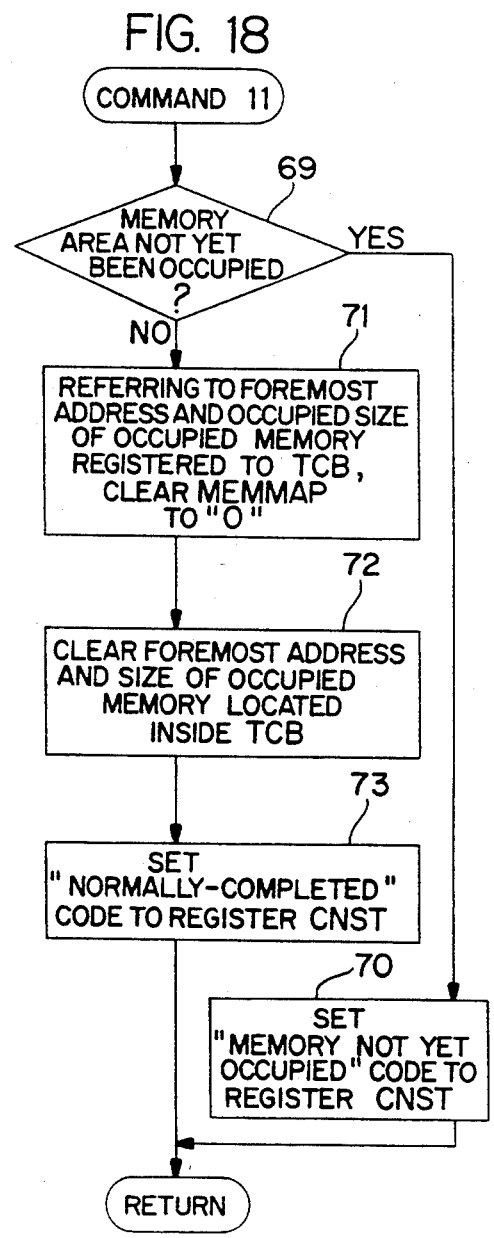
FIG. 17
FIG. 18

MULTI-TASK CONTROL DEVICE FOR CENTRAL PROCESSOR TASK EXECUTION CONTROL PROVIDED AS A PERIPHERAL DEVICE AND CAPABLE OF PRIORITIZING AND TIMESHARING THE TASKS

This application is a continuation divisional of application Ser. No. 07/751,665 filed on Aug. 23, 1991, now abandoned; which was a continuation of application Ser. No. 07/674,035 filed on Nov. 23, 1984, now abandoned.

FIELD OF THE INVENTION

The present invention relates to a computer peripheral device incorporating multi-task control function effective for microcomputer system control programs.

DESCRIPTION OF PRIOR ART

Conventionally, when operating a microcomputer system by having a CPU simultaneously process a plurality of tasks, programs become complex and require a large capacity, and in addition, it becomes quite difficult to properly design programs for switching tasks to be done. As a result, it becomes necessary to apply the multi-task control using the operating system (OS) of the computer system. Conventionally, since the operating system (OS) has been placed above the memory space controlled by the master CPU, switching of tasks has been executed by the master CPU itself. As a result, such a system like a microcomputer having only a negligible space for memory unavoidably constrains the memory space storing the user programs. In addition, the CPU has been obliged to perform comparative operations for giving priority to determine a specific task to be executed, thus resulting in a considerably large overhead needed for switching tasks.

OBJECT OF THE INVENTION

The present invention provides an extremely useful multi-task control device effectively applicable to a number of general-purpose microcomputers, in which, since the task priority comparison is executed independent of the CPU, it has become possible to improve the speed for processing the user programs on the part of the CPU, and in addition, interrupt signals are employed for the switching of those tasks executed by the CPU, thus the device incorporating these functions can be usefully applied to a wide variety of microcomputers.

The multi-task control device according to the preferred embodiment of the present invention controls a plurality of tasks by other means than the CPU which normally executes the control of those tasks mentioned above, while the control device is provided with means for controlling such operations executing the comparison of the priority to be given to those tasks and the means other for generating the task switching interrupt signal against the task underway so that this interrupt signal can be delivered to the CPU in accordance with the result of the comparative operation. By combining the multi-task control device embodied by the present invention with the CPU, a multi-task system can be established. Since the multi-task control device executes the comparative operation for the task priority in place of the CPU that conventionally performs it, the CPU can effectively use the time for executing the user programs, thus improving the operative efficiency of the CPU. In addition, after comparing the priority between tasks and finding it necessary to switch the task for execution, the multi-task control device then generates an interrupt signal against the CPU and informs it of the switching timing, and therefore, the multi-task control device embodied by the present invention can be effectively applied to general-purpose microcomputers.

BRIEF DESCRIPTION OF THE DRAWINGS

FIG. 5 is a table describing a variety of commands, and the input/output parameters used by the multi-task control device embodied by the present invention;

FIGS. 7 through 21 respectively shows the flowcharts also describing the main routine executed by the present device;

DETAILED DESCRIPTION OF THE EMBODIMENTS

Figures 1, 3, 4:
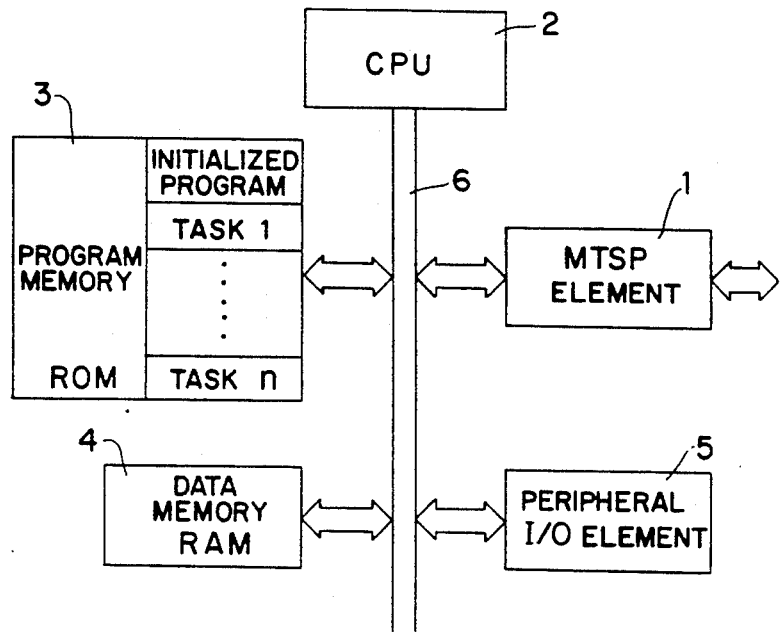
FIG. 1 shows a system configuration incorporating the multi-task control device reflecting the preferred embodiment of the present invention.
FIG. 3 shows a task control block (TCB) describing respective functional areas.
FIG. 4 shows the memory map (MEMMAP) areas shown in FIG. 2.

Referring now to attached drawings, one of the preferred embodiments of the present invention is described below. FIG. 1 shows a typical configuration of a microcomputer system reflecting one of the preferred embodiments. Element (or device) 1 indicates an independent multi-task support processor for realizing the multi-task control operation embodied by the present invention, and like other peripheral devices, this element is provided as one of the I/O elements, which is hereinafter called "multi-task control element". Like any conventional microcomputer system, the multi-task control device in the preferred embodiment is also provided with the CPU 2, program memory (ROM) 3, data memory (RAM) 4, and a peripheral I/O element 5 for other I/O devices, all of which are connected to each other together with the multi-task control element 1 via bus line 6. Program memory 3 stores such programs that are independently composed of the initialized program of the multi-task control element 1 and a plurality of tasks.

The multi-task control element 1 is actually the independently functioning element controlling a plurality of tasks in place of the CPU 2 which would otherwise have been obliged to execute these control operations. The multi-task control element 1 executes a variety of functions including the task scheduling (switching to the task to be executed either in order of the priority or by time-sharing), synchronization and communication between tasks (determines whether the task should be discontinued or restored by exchanging data between tasks), memory control (inhibits the overlapped use of memory areas available for each task), and the clock function (sets time using the internal timer). In other words, the multi-task control element 1 does not execute such functions inherent to the operating system of the computer system, but makes its control function as a peripheral device having such functions mentioned above.

Figure 2:
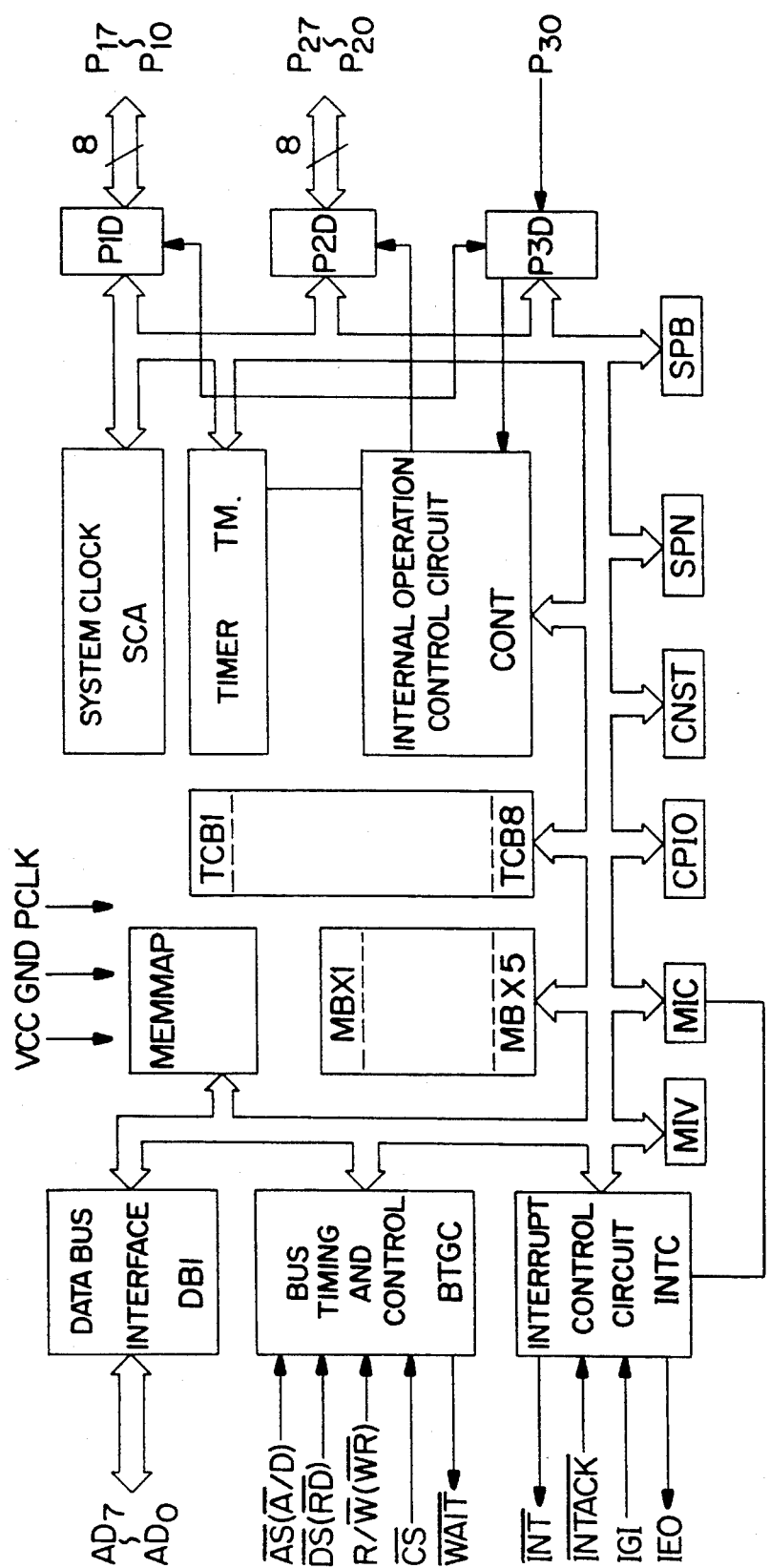
FIG. 2 shows a simplified block diagram of the internal configuration of the multi-task control device as one of the preferred embodiments of the present invention.

FIG. 2 is the simplified block diagram of the internal configuration of the multi-task control element 1. As shown in FIG. 2, the multi-task control element 1 has a number of registers that can be accessed from the CPU 2. The command parameter register CP10 stores such parameters that are input from the CPU 2 when executing the command or output after executing the command. The command status register CNST writes the command during write mode and stores the already executed command data during read mode. The new stack pointer register SPN outputs the stack pointer value of such a task to be newly executed so that this value can be made available for the task switching data.

The former stack pointer register SPB stores the values of stack pointers of the tasks which were under execution and these values are also made available for the task switching data.

The master interrupt control register MIC properly controls the multi-task control element 1 from generating interrupt signals against the CPU 2. The interrupt vector register MIV writes the interrupt vector values. The data registers P1D, P2D, and P3D respectively output and receive data to and from ports 1, 2, and 3. Ports 1 and 2 are respectively the 8-bit I/O ports which set the data input/output directions in the bit unit via programs. Port 3 is the 1-bit input port. This port can be set to the event input status (transfers the task suspended by transition of signals entering port 3 into "ready" status). These registers are used for mutually exchanging data between the multi-task control element 1 and the CPU 2 after being accessed by the CPU 2. The data bus interface DBI, bus timing generator/control circuit BTGC, and the interrupt control circuit INTC are provided as the interface circuit connected to the CPU 2.

The task control block TCB (1 through 8) is actually the memory areas storing the task status, where a maximum of 8 tasks can be dealt with. As shown in FIG. 3, each block has such a memory area storing (a) task status, (b) task priority, (c) the number of tasks connected to "ready" Q earlier, (d) the number of tasks connected to "ready" Q later on, (e) the foremost address of the work memory occupied by task, (f) the size of the foremost address, (g) mail box number being used, and (h) the stack pointer value when the task execution is discontinued. The mail box MBX is a buffer memory area provided to allow the exchange of data between tasks. The memory map MEMMAP is a memory area for controlling the work memory, for example, being composed of 32 bytes as shown in FIG. 4. The memory map MEMMAP can control a 256K byte unit of work memory. When the work memory is not used, bit "0" is set, whereas bit "1" is set when the memory area is occupied. Timer TM causes the multi-task control element 1 to internally generate an interrupt signal for the time-sharing process (a process for executing such tasks having the same priority at specific intervals).

The system clock area SCA is a memory area storing the time data including hour, minute, and second counted by the output from the Timer TM. The internal operation control circuit CONT incorporates the logic operation unit ALU, ROM storing the programs of the multi-task control element 1, RAM for temporary memory, and flag registers for executing various control operations. The CPU 2 accesses the multi-task control element 1 by applying a command generated by a specific task being executed. Conversely, the multi-task control element 1 accesses the CPU 2 by applying an interrupt signal generated by the multi-task control element 1. FIG. 5 shows a table describing the kinds of commands and the input/output parameters. Basic operations of the multi-task control element 1 are described below. In the following operations, it is assumed that the task control block TCB stores the status of respective tasks.

The multi-task control element 1 first chooses the top-priority task from the executable tasks, and then prepares the value of the stack pointer of the registered task in the new stack pointer register SPN. After preparing the stack pointer value, the multi-task control element 1 generates an interrupt signal against the master CPU 2. Then, the CPU 2 executes the interrupt process routine and then loads the stack pointer value set in the multi-task control element 1 into its own stack pointer, and then draws out the previously written initial register value from the stack and rewrites the register. The multi-task control element 1 then executes the designated task under the control of the CPU 2. The multi-task control element 1 stands by until it receives a command from the task being executed or until an interruption is activated by the input entering either the timer TM or port 3. For example, on receipt of a command, the multi-task control element 1 first analyzes the command and then processes it. If the command contains the task switching function, the multi-task control element 1 then sets the stack point value of the next-switchable task into the new stack pointer register SPN, and then generates an interrupt signal against the CPU 2. This interrupt signal causes the CPU 2 to stop the execution of a specific task being executed, and then, it reads the stack pointer value of the next-executable task from the multi-task control element 1. Referring now to the attached flowcharts, further details of the system operation are described below.

Figure 6:
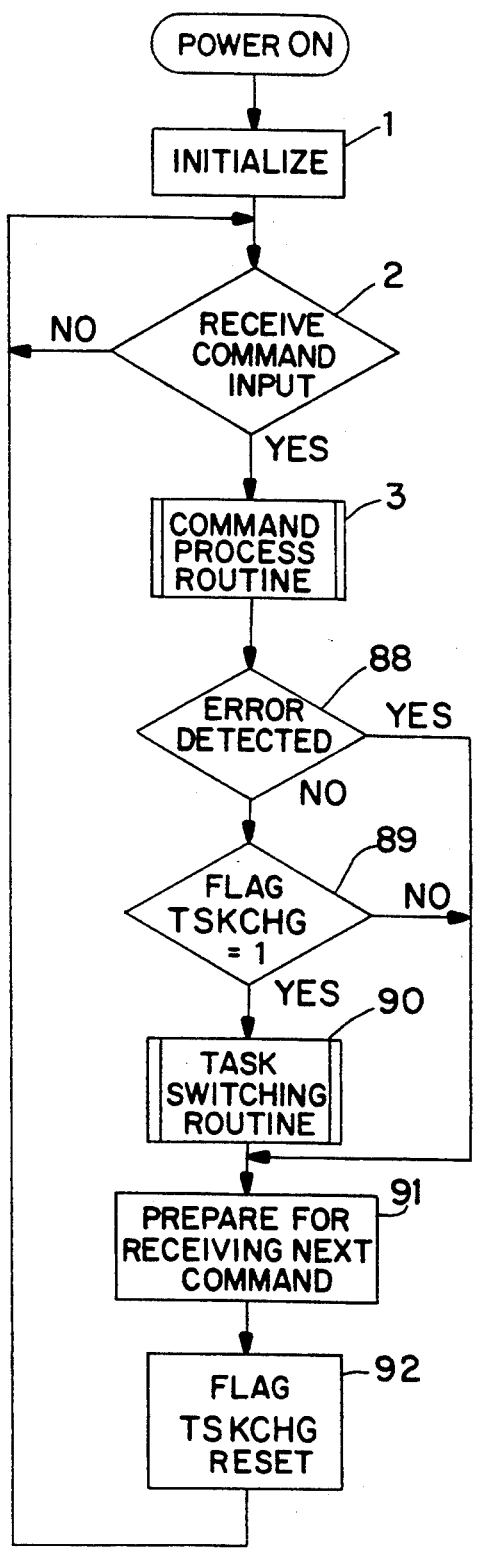
FIG. 6 is the flowchart describing the operation of the main routine executed by the multi-task control device.
Figure 22:
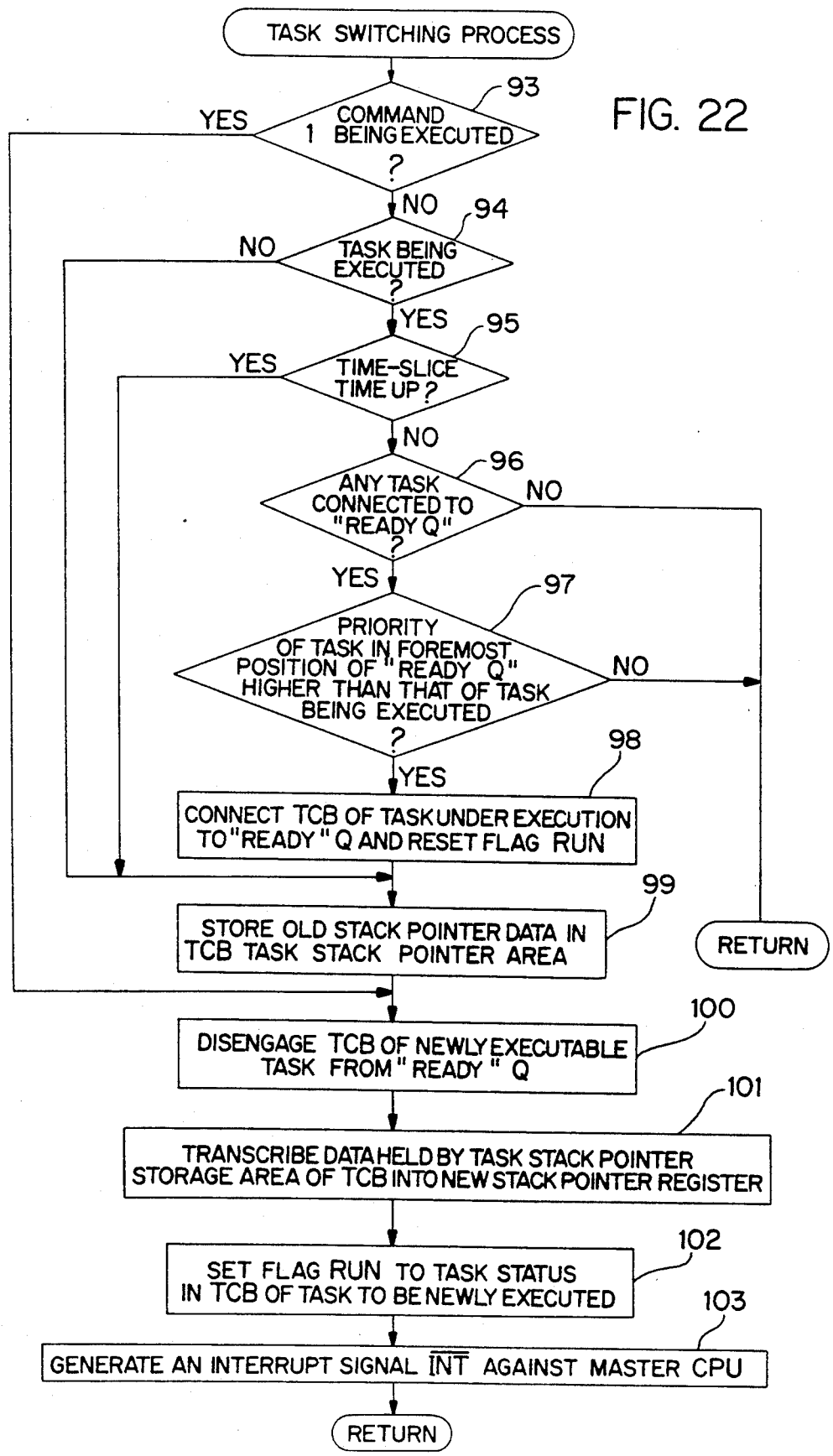
FIG. 22 shows the flowchart describing the task switching routine operations.
Figure 23:
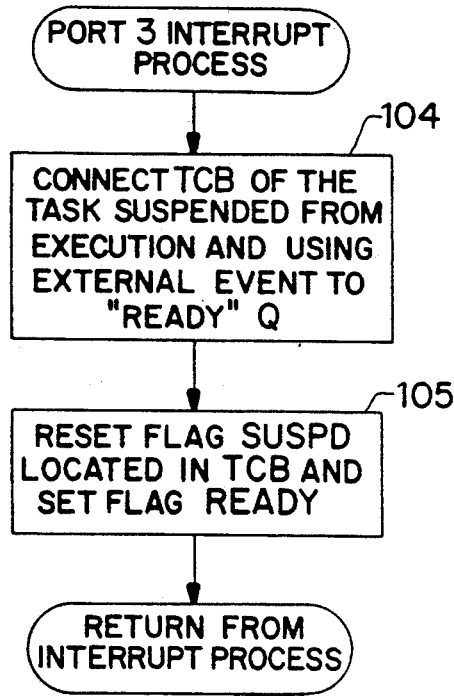
FIG. 23 shows the flowchart describing an interrupt routine operations activated by the event input.
Figure 24:
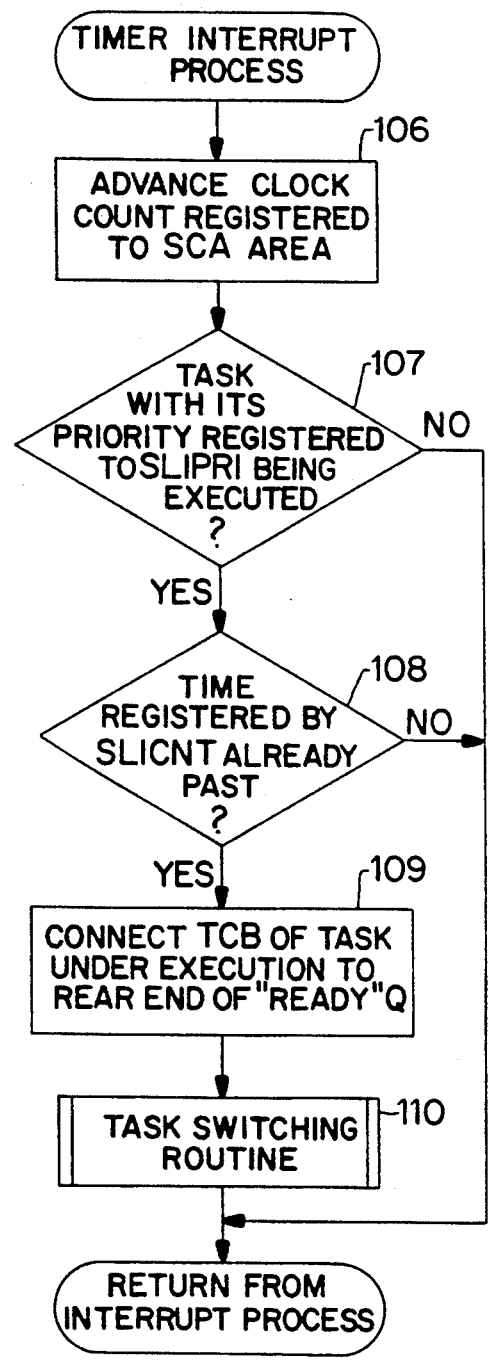
FIG. 24 also shows the flowchart describing the timer interrupt process routine.

FIG. 6 is a flowchart describing the main routine operations of the multi-task control element 1; FIGS. 7 through 21 respectively show the flowcharts describing the process routine operations executed by commands 0 through 14; FIG. 22 shows the flowchart describing the task switching routine operations; FIG. 23 shows the flowchart describing the interrupt process routines activated by the event input sent to port 3; and FIG. 24 shows the flowchart describing the interrupt process routine operation of the timer TM.

As shown in FIG. 6, when the power is supplied to the system, the multi-task control element 1 first enters the reset operation to initialize all the internal functional elements (step 1). Then, the multi-task control element 1 waits, until the activated command from the CPU 2 is written into the command status register CNST (step 2). As soon as the command has been written, the multi-task control element 1 processes the command according to respective command codes (step 3). Command 0 (INIT shown in the flowchart of FIG. 7) initializes the multi-task control element 1, while this command registers the vector value to be delivered to the CPU 2 when the multi-task control element 1 generates an interrupt signal against the CPU 2, the foremost address of the work memory area controlled by the multi-task control element 1 and its size, and the priority of tasks, into respective tasks. When this command has been executed, the multi-task control element 1 checks the presence of error in the input data (step 4), and if any error is present, the error code is then set to the command status register CNST (step 5). If no error is present in the input data, the interrupt vector value is written into the interrupt vector register MIV (step 6) from the data delivered to the command parameter register CPIO, and in addition, based on the foremost address of the work memory area and its size, the memory map MEM-MAP is initialized (step 7). Then, based on the priority of the written task, the task control block TCB is prepared (step 8).

The multi-task control element 1 then makes up "ready" Q by arraying all the tasks according to the priority order (step 9). At the same time, the priority orders are given to all the tasks by (c) and (d) of the task control block TCB. After completing this operation, the normally-completed code is set to the command status register CNST (step 10), then the TSKCHG flag of the internal operation control circuit CONT is reset (step 11), and finally the step returns to the main routine shown in FIG. 6. Likewise, even when the error code is set to the command status register CNST, the TSKCHG flag is also reset, and the step returns to the main routine shown in FIG. 6. The command 1 (TSTR shown in the flowchart of FIG. 8) leads the initialized multi-task control element 1 into the operation-executable state. The command 1 checks to see if the command 0 process operation has been executed, or not (step 12). Only when this operation is completed. The command 1 then sets the TSKCHG flag (the one controlling the internal operation control circuit CONT) so that the top-priority task connected to the foremost position of "ready" Q can be set to the executable state (step 14) before the main routine shown in FIG. 6 is resumed. If the command 0 has not yet been executed the command 1 then sets the error code to the command status register CNST (step 15) before the main routine is resumed. The commands 0 and 1 and the data written into the multi-task control element 1 are previously stored, for example, in the initial program of the program memory 3 shown in FIG. 1. Programs can be changed according to the task content, and therefore, a variety of initial programs can be set by the multi-task control element 1. The command 2 (TCRT shown in the time-chart of FIG. 9) optionally generates tasks after the initialization, while the task number and its priority order to be generated as the input data are written into the command parameter register CPIO of the multi-task control element 1. As soon as this command has been executed, the multi-task control element 1 checks to see if there is any error in the input data (step 15). If any error is present, the error code is written into the command status register CNST (step 16). If no error is detected, a task control block TCB is generated (step 17) for the task designated by the input data. The task status (a) of the Task control block TCB (see FIG. 3) has 4 flags described below.

Flag RUN shows that the task is being executed. Flag READY shows that the designated task is ready and connected to "ready" Q. Flag PENDW shows that the system waits for receiving any message. Flag SUSPEND shows that the tasks are being suspended. When the above task control block TCB is generated (step 17), the flag READY of which is simultaneously set. Then, "ready" Q is re-connected to such tasks in order of higher priority (step 18). Next, the normally-completed code is set to the command status register CNST (step 19), and then flag TSKCHG is set (step 20) in order to compare the priority of the task being executed and the task connected to the foremost position of "ready" Q, and finally the step returns to the main routine shown in FIG. 6. The command 3 (TREL shown in the time chart of FIG. 10) erases unnecessary task and executes this operation using the erasable task number as the input data. After checking to see if any error is present in the input data (step 21), if any error is detected, the error code is set to the command status register CNST (step 22), and then the step returns to the main routine shown in FIG. 6. If no error is present, in order to release the work memory occupied by the task to be erased, the multi-task control element 1 then reads the foremost address (e) of the occupied memory and its size (f) in the task control block TCB of the erasable task, and then, based on this data, the area specified by the memory map MEMMAP is cleared into "0" (step 23). If this erasable task is in "ready" status, the task control block TCB of this task is then separated from "ready" Q (step 24), and then clears all from this task control block TCB (step 25). After completing these operations, the normally-completed code is set to the command status register CNST (step 26), and then the step returns to the main routine. The command 4 (TRSM shown in the flowchart of FIG. 11) leads such a task having the task number designated by the input data and remains in the stand by or suspended status into the ready status (a condition to be reactivated). This operation is executed using the task number as the input data. When starting the execution of the command 4, the system first checks to see if there is any error in the input data (step 27), and if any error is detected, the error code is set to the command status register CNST (step 28), and then the step returns to the main routine shown in FIG. 6. If no error is detected, either flag PENDW or flag SUSPEND of the designated task is reset, and then sets flag READY, then connects the task control block TCB to "ready" Q in order of higher priority (step 29). Then, the normally-completed code is set to the command status register CNST (step 30), and then activates flag TSKCHG in order to compare the priority order between the task being executed and the task connected to the foremost position of "ready" Q (step 31), and finally, the step returns to the main routine. The command 5 (TSPD shown in the flowchart of FIG. 12) suspends such a task having the task number designated by the input data and remains either being executed or being ready. When executing the command 5, the system checks to see if there is any error in the input data, and if any error is detected, the error code is set to the command status register CNST, and then, the step returns to the main routine (steps 32 and 33).

If no error is detected, using the input data, the system first checks to see if the suspended task has been designated by the input signal from port 3 (external event) to enter into the ready status (to be reactivated) (step 34). If the external event has not been designated, operation proceeds to step 37. If the external event is designated, the system then checks to see if any other tasks have already used the external event (step 35). If it is used, the error code is set to the command status register CNST (step 33), and then the step returns to the main routine. If the external event is not being used, any internal interruption caused by the transition of the input signal from port 3 is then enabled (step 36). In other words, by entry of the command 5 input data, activation of the external event can be designated. Next, including such a case in which some steps have been skipped, the system then resets either flag RUN (when the designated task is being executed) or flag READY (when the designated task is being ready) of the task control block TCB, and then sets flag SUSPEND (step 37). After completing these operations, the normally-completed code is set to the command status register CNST (step 38).

Then, considering such a case in which the designated task remains in ready status, the system disengages this task from "ready" Q, re-arranges the task control block TCB connected to "ready" Q in order of the priority (step 39), and then activates flag TSKCHG in order to compare the priority orders between the task being executed and the other task connected to the foremost position of "ready" Q (step 40), and finally, the step returns to the main routine shown in FIG. 6.

The command 6 (TPRI shown in the flowchart of FIG. 13) changes the priority order of those tasks bearing numbers designated by the input data. After checking to see if any error is present in the input data (step 41), if any error is detected, the error code is then set to the command status register CNST (step 42), and then the step returns to the main routine. If no error is present, the system then rewrites the priority (b) (see FIG. 3) in the task control block TCB of the designated task into a specific value indicating the modified priority order of the input data (step 43). Next, the system re-arranges the task control block TCB connected to "ready" Q in order of the priority (step 44), sets the normally-completed code to the command status register CNST (step 45), and then activates flag TSKCHG to compare the priority order between the task being executed and the other task connected to the foremost position of "ready" Q (step 46), and finally, the step returns to the main routine.

The command 7 (TSLI shown in the flowchart of FIG. 14) constrains the time for occupying the CPU 2 by a group of tasks each having the same priority order designated by the input data. In orther words, the command 7 designates the time-sharing process of such tasks having such priority orders almost identical to each other. The time-sharing process is effective only when there is no task having a priority higher than the designated priority and remains in ready status. If any task having the priority higher than the designated order remaining in ready status is present, this task in then executed, voiding the time-sharing process. However, if such task having higher priority is absent, the time-sharing process can be done effectively. When executing this command, the system first checks to see if any error is present in the input data (step 47). If any error is detected, the error code is set to the command status register CNST (step 48), and finally, the step returns to the main routine. If no error is detected, the system then identifies whether the input data designates the cancellation of the time-sharing process (step 49). If it should be cancelled, the command 7 then clears the time-sharing control registers SLICNT and SLIPRI of the internal operation control circuit CONT into value "0" (steps 50 and 51). If the input data newly designates the provision of the time-sharing process, the input data first sets the CPU occupying time in the time-sharing control register SLICNT for the task being designated (step 52), and then sets the priority order of the task executing the time-sharing process in the other time-sharing control register SLIPRI (step 53). Finally, the normally-completed code is set to the command status register CNST (step 54), and then the step returns to the main routine. The command 8 (CSET shown in the flowchart of FIG. 15) sets the time in the clock provided in the multi-task control element 1. This command is executed by writing hour, minute, and second data from the CPU 2 into the command parameter register CPIO of the multi-task control element 1. After checking to see if any error is present in the input data (step 55), if any error is detected, the error code is set to the command status register CNST (step 56), and then the step returns to the main routine. If no error is detected, the time data including hour, minute, and second is transferred to the system clock area (step 57). Then, the normally-completed code is set to the command status register CNST (step 58), causing the step to return to the main routine. The clock counts up time by applying the timer interrupt routine described later on. The command 9 (CGET shown in the flowchart of FIG. 16) reads the present time from the clock. When executing the command 9, the time data including hour, minute, and second is transferred from the system clock area SCA to the command parameter register CPIO which is accessible from the master CPU 2. After the transfer is completed, the normally-completed code is set to the command status register CNST (step 60), causing the step to return to the main routine. The command 10 (MALC shown in the flowchart of FIG. 17) approves the use of such a work memory having a specific size requested for the task that executed this command after being selected from such work memory areas controlled by the multi-task control element 1. The command 10 is executed by writing the number of work memory (that contains 100H unit) to be requested against the command parameter register CPIO. When executing the command 10, the system checks to see if any error is present in the input data (step 61). If any error is detected, the error code is set to the command status register CNST (step 62), causing the step to return to the main routine. If no error is detected, the system then checks the memory map MEMMAP to see whether the requested work memory is vacant (step 63). If no vacant memory area is available, the memory-occupy-unable code is set to the command status register CNST (step 64), causing the step to return to the main routine. If any vacant memory area is available, the system them sets code "1" to the bit located on the memory map MEMMAP so that the bit can exactly match the size requested by the task that has already executed the command 10 (step 65). The multi-task control element 1 then sets values of the foremost address (e) and memory size in the foremost address (e) of the occupied memory and in the area (see FIG. 3) of the occupied memory size (f) located in the task control block TCB of the task that has executed the command (step 66). Next, the foremost address of the occupied memory is written into the command parameter register CPIO. After the writing is completed, the normally-completed code is set to the command status register CNST (step 68), and then the step returns to the main routine.

The command 11 (MREL shown in the flowchart of FIG. 18) releases the occupied work memory area. If the task that has executed the command 11 doesn't occupy the work memory (step 69), the error code is set to the command status register CNST (step 70), causing the step to return to the main routine. Conversely, if the work memory is already occupied, the system then checks to see the values of the foremost address (e) and the size (f) of the occupied memory registered in the task control block TCB of a specific task that has executed the task, and then resets the corresponding bit on the memory map MEMMAP to "0" (step 71).

The command 11 then causes the foremost address (e) and the size (f) of the occupied memory of the task control block TCB to be cleared (step 72). The command 11 finally sets the "normally-completed" code to the command status register CNST (step 73), causing the step to return to the main routine. As described above, when the task requests memory, the system executes the command 10 (MALC, that controls the memory occupation) against the multi-task control element 1. After being used by a task, if memory should be released, the system executes the command 11 (MREL, that releases memory). By activating the commands 10 and 11, the multi-task control element 1 executes such functions so that it identifies whether the working memory having a maximum of 64K bytes of the pre-registered memory areas is being used based on the unit of 100 H bytes, or not, and then allocates any vacant memory area to a specific task in order that this memory area can match the size requested by the task.

These functions are particularly useful for providing a plurality of tasks limited memory space, and in addition to this, such functions effectively prevent a plurality of tasks from overlapping the use of identical memory area. Provision of work memory areas for the multi-task control element 1 is effected when the multi-task control element 1 sets its initialization (when command 0 is executed).

The command 12 (POST shown in the flowchart of FIG. 19) delivers the needed data to a memory area called "mail box" MBX provided in the multi-task control element 1. The mail box MBX is the message relay point between the task that executed the command 12 and the other task (that executes the command 13 described in the following section). Any of the five mail boxes MBX1 through MBX5 can be designated for use. The command 12 is executed by writing the number of any mail box available for the command parameter register CPIO and the data to be delivered to the designated mail box MBX. After executing the command 12, the system checks to see if any error is present in the input data (step 71), and if any error is detected, the error code is set to the command status register CNST (step 72), causing the step to return to the main routine. If no error is detected, the outgoing data is written into the mail box MBX bearing the designated number (step 73). Next, the system checks to see if there is any task that awaits the data to be delivered to the designated mail box MBX subsequent to the execution of the commands 13 and 12 (step 74). This checking operation is performed by referring to flag PENDW in the task stater (a) of the task control block TCB of all tasks and the mail box number (g). If no task awaits the delivery of data, the step skips over to step 76. If any task still waits for the delivery of data (assuming that only one task awaits the delivery of data in the present description of the preferred embodiment), the system then resets flag PENDW of the task control block TCB of the task that waits for the delivery of data and then sets flag READY, and re-connects "ready" Q according to the priority order (step 75). Then, the system sets the normally-completed code to the command status register CNST irrespective of the presence or absence of such a task awaiting the delivery of data (step 76). Finally, the system sets flag TSKCHG (step 77), causing the step to return to the main routine. Command 13 (PEND shown in the flowchart of FIG. 20) receives data from any other task through the designated mail box MBX. This command is executed by writing the number of a specific mail box MBX receiving data into the command parameter register CPIO. After the command 13 has been executed, the system then checks to see if any error is present in the input data (step 78), and if any error is detected, the error code is set to the command status register CNST (step 79), thus causing the step to return to the main routine. If no error is detected, the system then checks to see if the needed data has already been written into the designated mail box MBX (step 80). If the data is not written, flag RUN is reset and flag PENDW will be set (step 81). Flag TSKCHG is also activated (step 82). Then, the data-non-delivered code is set to the command status register CNST (step 83), causing the step to return to the main routine. If the data has already been written, the data written in the designated mail box MBX is then transferred to the command parameter register CPIO (step 84), and then sets the normally-completed code to the command status register CNST (step 85), causing the step to return to the main routine. The command 14 (PMOD shown in the flowchart of FIG. 21) orients the data input/output directions for ports 1 and 2. This command is executed by setting the code to the command parameter register CPIO for designating the data input/output directions between ports 1 and 2. In accordance with the code set to the command parameter register CPIO, the data input/output directions between ports 1 and 2 are designated (step 86), then the normally-completed code is set to the command status register CNST (step 87), causing the step to return to the main routine. After executing any of the process routines related to the commands 0 through 14 issued by a specific task and having the step returned to the main routine of FIG. 6, the system first checks to see if the error code has been set to the command status register CNST (step 88). If the error code has been set, the step then skips over to step 91, and if the error code has not yet been set, the system then checks to see if flag TSKCHG has already been set (step 89). If flag TSKCHG remains "0", the step then skips over to step 91, and if it is "1", the system then executes the task switching routine (step 90). The task switching routine is described in detail in the flowchart of FIG. 22. When the step has returned to the main routine after skipping from step 88 or 89, or after executing the task switching routine (step 90), the system then prepares for accepting the next command (step 91), resetting flag TSKCHG (step 92), and then returns to step 2, where the system stands by for accepting the next command. As described above, as soon as flag TSKCHG has been set (activates "1") by the command process routine, the system executes the task switching routine. Referring now to the flowchart of FIG. 22, as soon as the task switching routine has been entered, the system first checks to see if it is the right time for executing the command 1 (terminates the initialization and starts the program execution) (step 93). If it is the right time for executing the command 1, the step then skips over to step 100, and then by sequentially executing ensuing processes, the system causes the multi-task control element 1 to generate an interrupt signal against the CPU 2 so that, of a number of tasks that are registered by the initialization effected by command 1, a specific task being ready and having the top priority can be executed.

Figure 12:
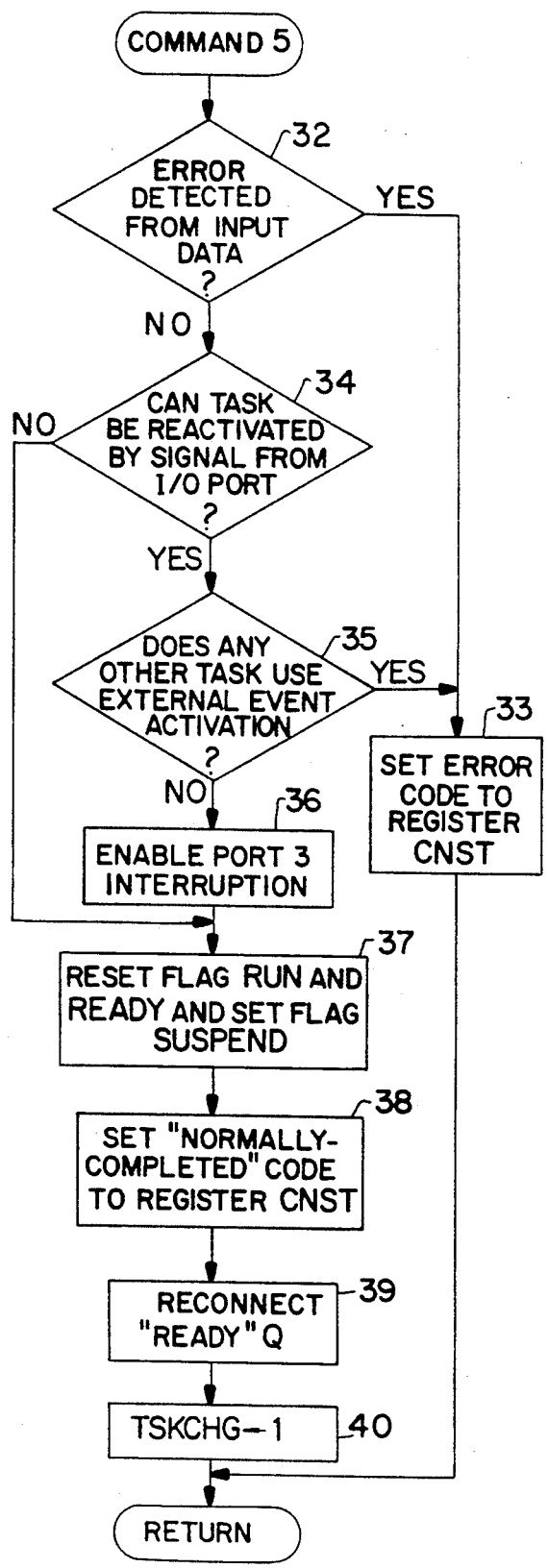
Figure 13:
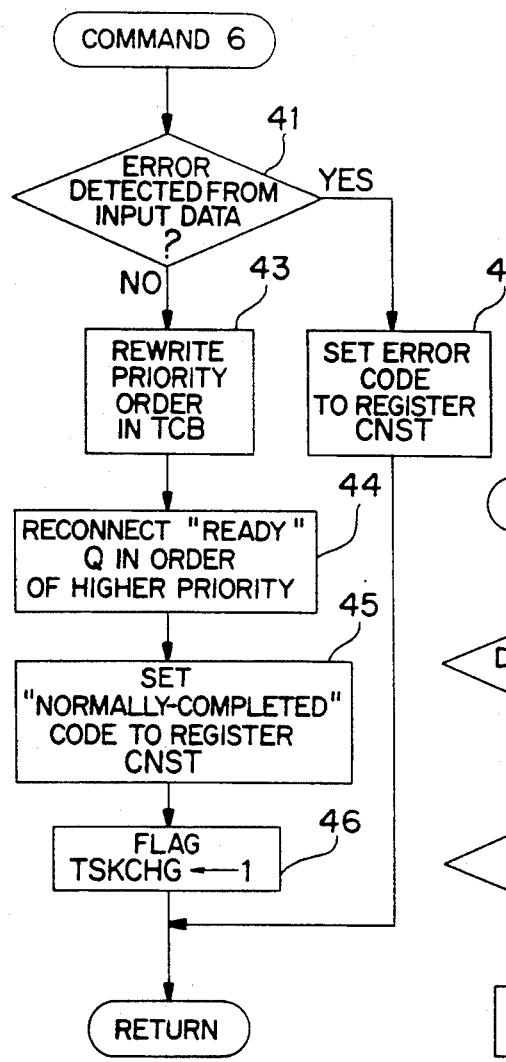
Figure 14:
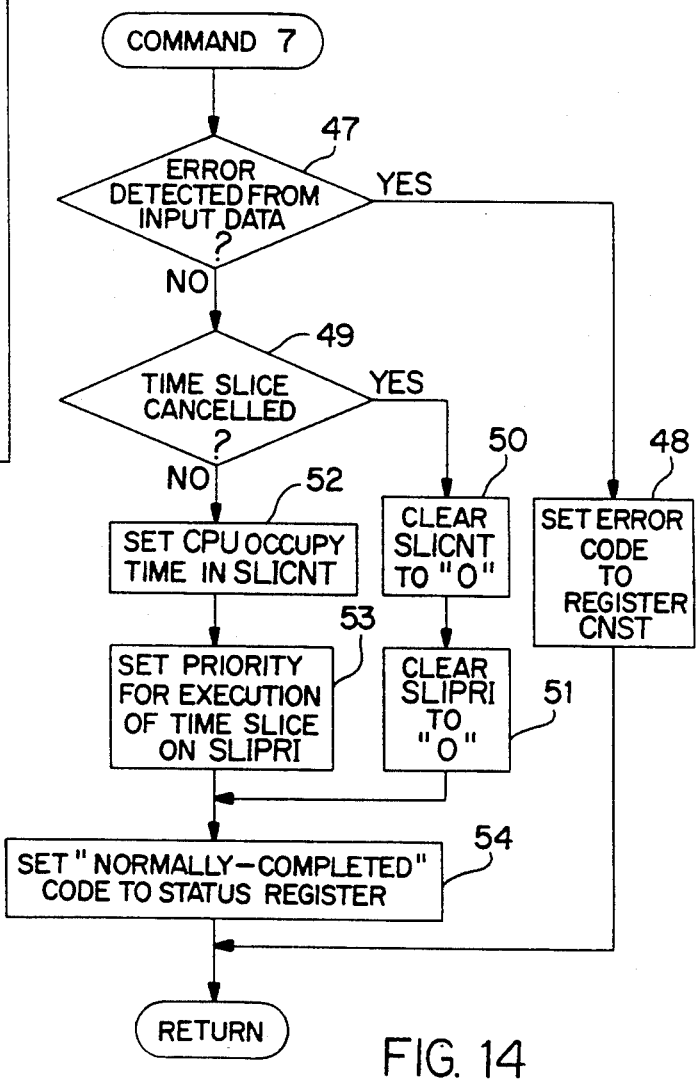
Figures 15, 16:
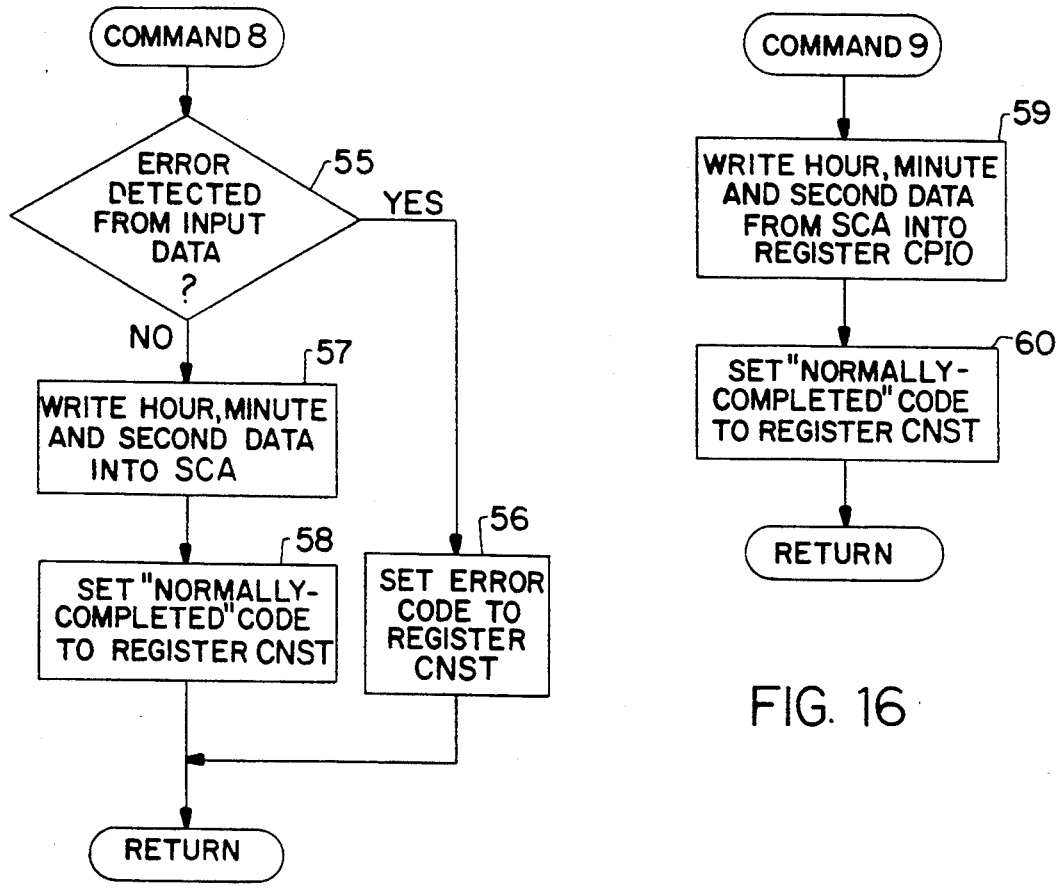
Figure 19:
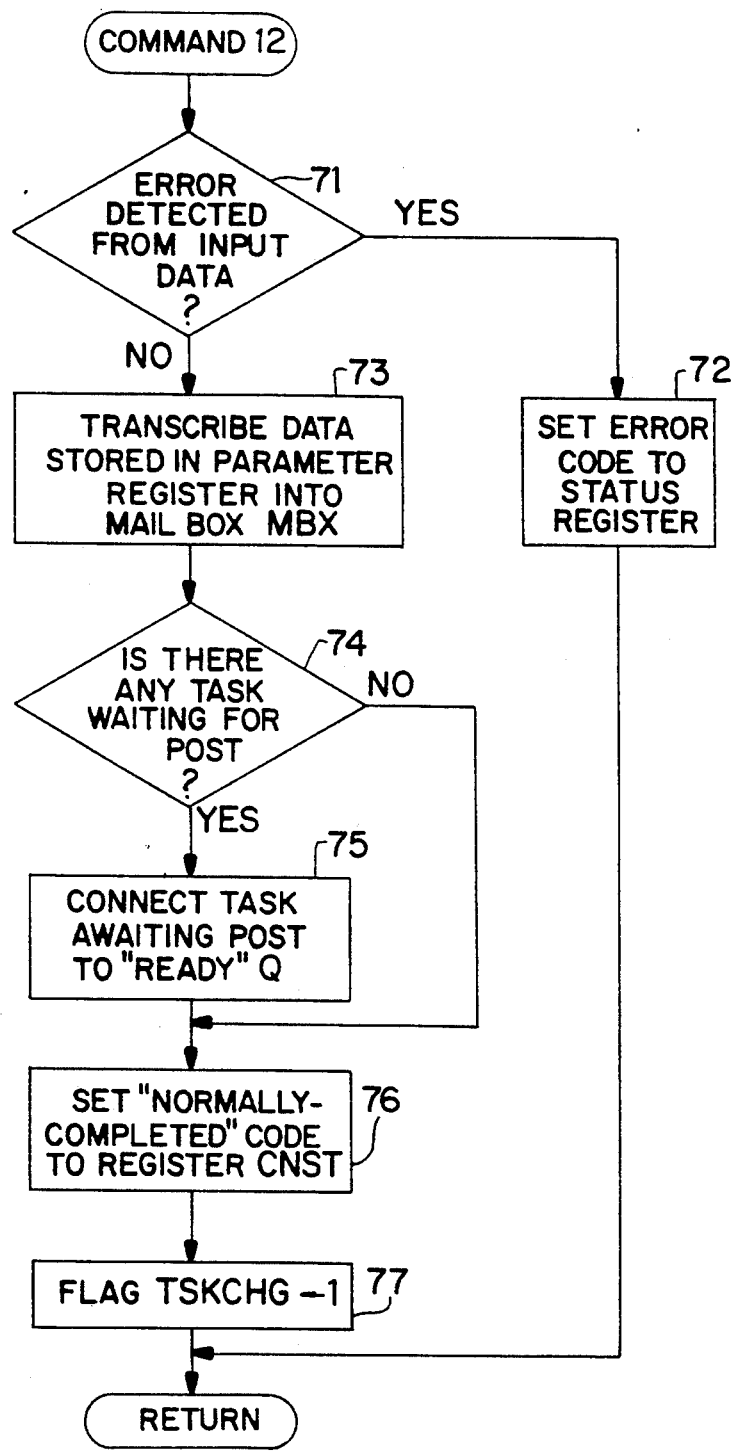
Figure 20:
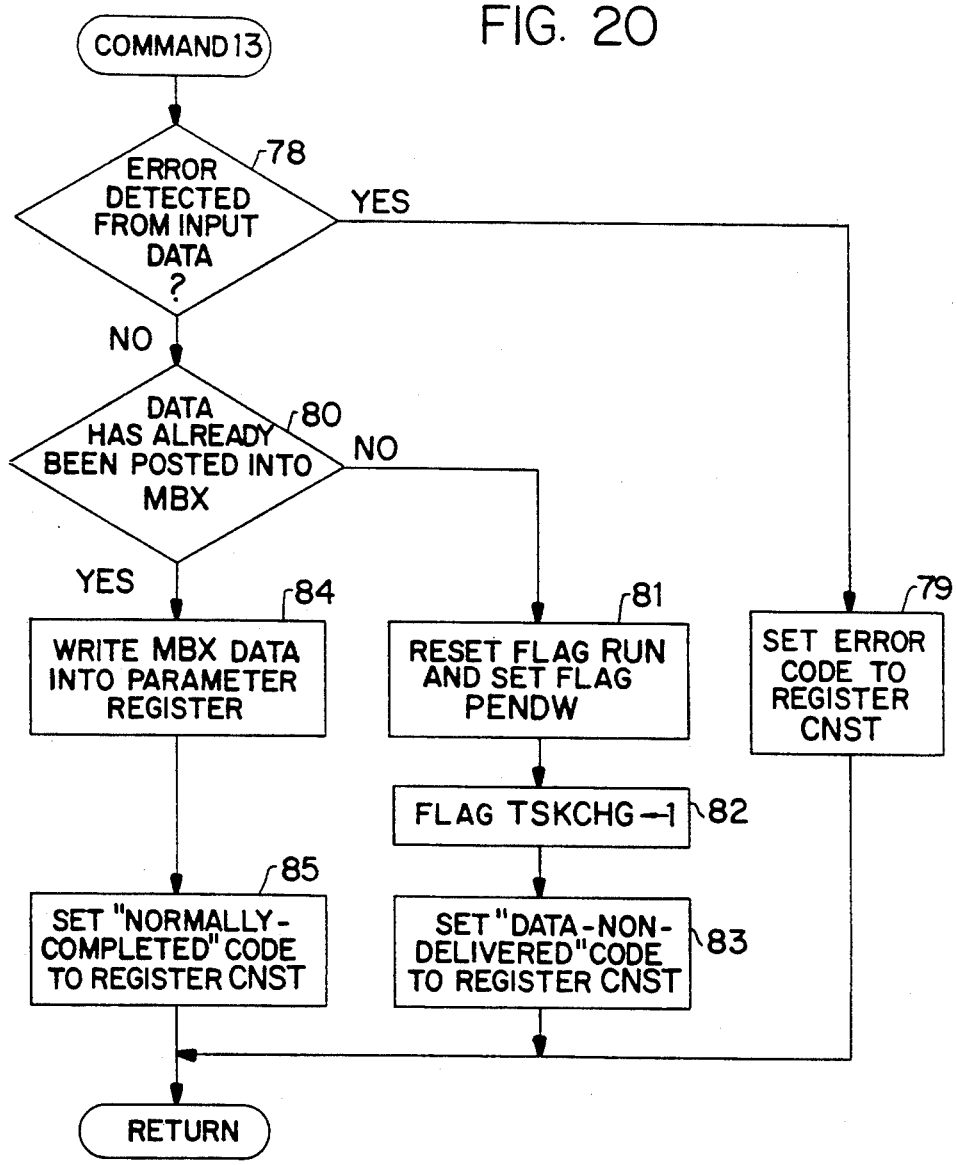
Figure 21:
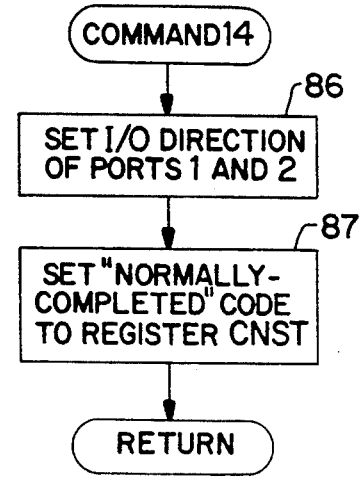

The system first disengages the task control block of the task connected to the foremost position of "ready" Q from "ready" Q (step 100), writes the value of the task stack pointer (h) (see FIG. 3) of the task control block TCB into the new stack pointer register SPN (step 101), and then sets flag RUN to the task status (a) located in the task control block TCB (step 102), causing the multi-task control element 1 to generate an interrupt signal $\overline{INT}$ against the CPU 2 (step 103). As a result, by entry of the task switching interrupt routine activated against the CPU 2 in response to the interrupt signal $\overline{INT}$ thus generated, the CPU 2 reads the value of the new task stack pointer, and then, simultaneous with the return step of the interrupt routine, the CPU 2 executes the designated task. Except for the moment when the command 1 is being executed, the system checks to see if the task is correctly executed (step 94). If the designated task is not being executed, the step skips over to step 99 and then writes the data of the former stack pointer register SPB into the area of the task stack pointer (h) in the task control block TCB of such a task that was executed last, and then the written value is stored. After completing these operations, additional interrupt signals $\overline{INT}$ will also be generated by the multi-task control element 1 against the CPU 2 so that other tasks can also be executed using steps 100 through 103. When the task is under execution (while RUN status continues), the system checks to see if the designated time for the time-sharing process is already up, or not (step 95). As soon as the time is up for executing the time-sharing process for the designated task, the step then skips over to step 99. The skip routine is effective only when the time-interrupt process is executed in the flowchart of FIG. 24, which will be described later on. If the time is not yet up, the system checks to see if there is any task connected to "ready" Q (step 96). If no task is found that is actually waiting for its execution (remains being ready) other than the one being executed, the step returns to the main routine shown in FIG. 6. If there is any task connected to "ready" Q, the multi-task control element 1 then compares the priority orders between the task actually being executed and the other one connected to the foremost position of "ready" Q (step 97). If the task under execution holds a priority higher than the other, the step also returns to the main routine shown in FIG. 6. If the flow of the operation returns to the main routine from steps 96 and 97, the multi-task control element 1 will not generate any interrupt signal $\overline{INT}$ to allow the execution of the present task to be continued. Conversely, if the task connected to a foremost position of "ready" Q holds the priority higher than that which is being executed, the system then connects the task control block TCB of the task being executed to "ready" Q, and then resets flag RUN (step 98). The multi-task control element 1 then causes the data of the former stack pointer register SPB to be stored in the (h) area of the task stack pointer of the task control block TCB (step 99) before generating interrupt signals $\overline{INT}$ for subsequent operations using steps 100 through 103. The new task to be executed by steps 100 through 103 is being connected to the foremost position of "ready" Q as described earlier, whose priority order has been promoted to the top as a result of the command execution. After generating the interrupt signal $\overline{INT}$, the step returns to the main routine shown in FIG. 6, and then the system prepares for accepting the next command (step 91 of FIG. 6). FIGS. 23 and 24 respectively show the flowcharts describing the interrupt process routines against the main routine shown in FIG. 6. FIG. 23 describes the interrupt process activated by the input fed to port 3, in which the task is once suspended by the command 5 (that suspends tasks as shown in the flowchart of FIG. 12) and then reactivated by the external event signal. Actually, this routine is activated by trasition of signals fed to port 3. In this routine, using the command 5, the task control block TCB of the task that activates the external even signal is connected to "ready" Q in order of the priority (step 104), and then flag SUSPEND in the task control block TCB is reset, while activating flag READY (step 105). In other words, this reactivates the once-suspended task, and then, the flow of the operation returns from the interrupt process routine.

Figures 7, 8:
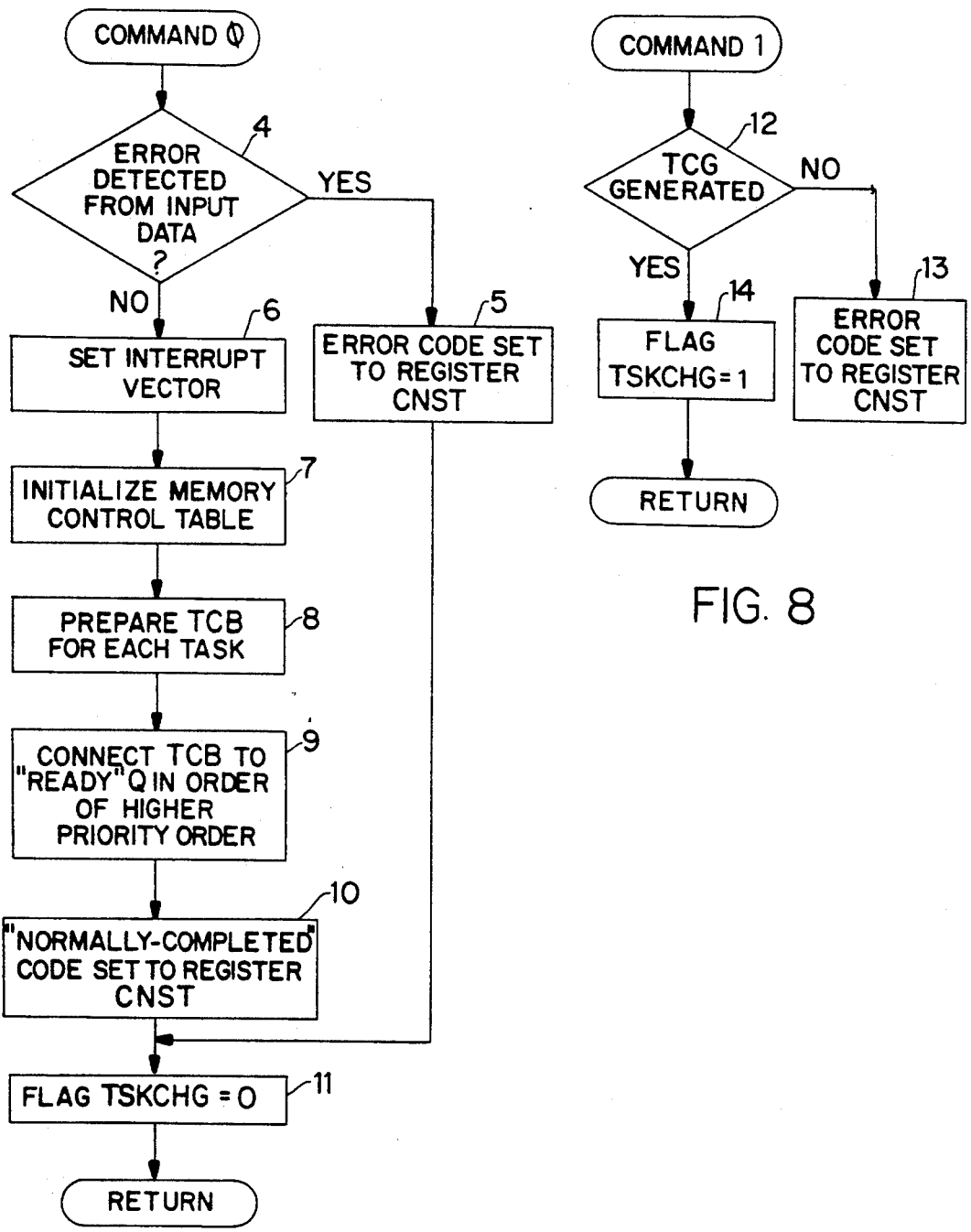
Figures 9, 10:
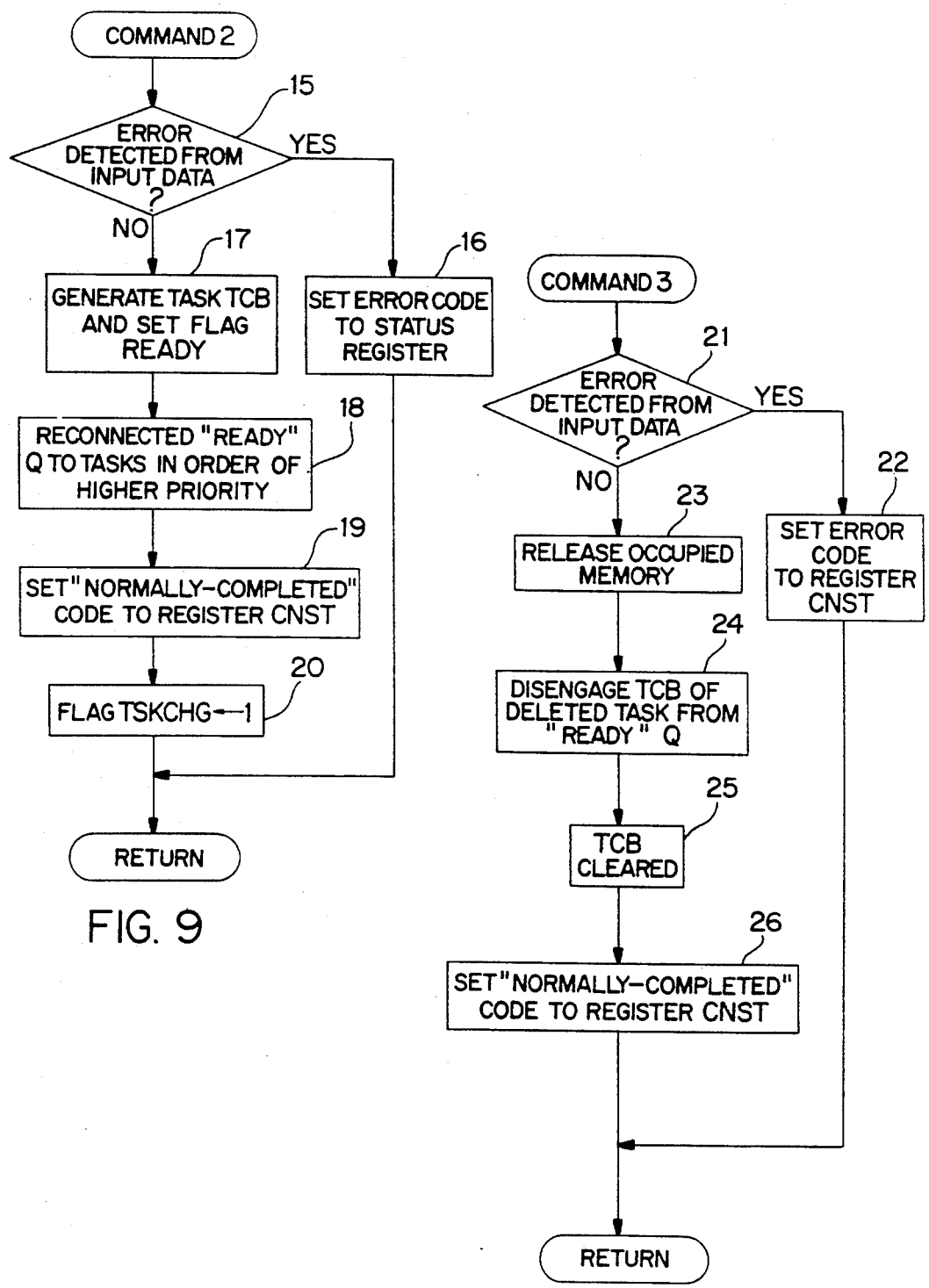
Figure 11:
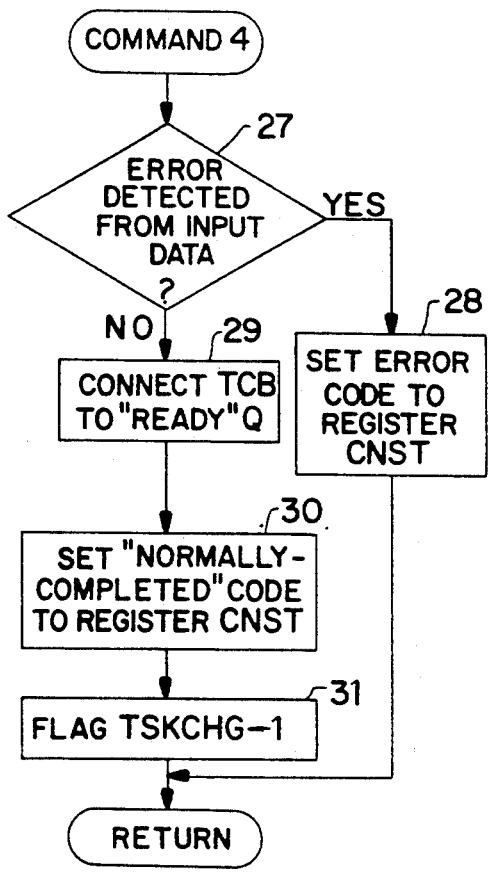

FIG. 24 shows the flowchart describing the interrupt process routine activated by the timer, in which, using the signal from the timer TM shown in FIG. 2 as the internal interrupt signal and by generating this at specific intervals, the system enters the timer interrupt process routine. When the internal interrupt signal is generated by the timer TM, the clock value including the data related to hour, minute, and second registered in the system clock area SCA is brought forward (step 106). Next, the multi-task control element 1 compares the priority orders between that which has been registered by register SLIPRI which was activated by the command 7 (that provides tasks with the time-sharing process as shown in the flowchart of FIG. 7) and that of the task actually being executed (step 107). The time-sharing process is effective only when such a task being ready and having a priority higher than that designated by the time-sharing process is not present. If any task being ready and having a priority higher than that designated by the time-sharing process is present, this task will be executed to void the time-sharing process, whereas the time-sharing process is effective if such a task having the higher priority is absent. Comparison of the priority orders performed during step 107 is actually equivalent to the checking operation to see if the task having the priority registered in register SLIPRI is being executed, or not. If such a task designated by the time-sharing process is not being executed, then the flow of the operation immediately returns from the interrupt process routine. If the priority registered in register SLIPRI is exactly identical to that of the task actually being executed, in other words, if it is identified that the task actually being executed is exactly the one designated by the time-sharing process, the multi-task control element 1 then checks to see if the time registered in register SLICNT has already passed, or not (step 108). If the time is not yet past, the flow of the operation returns from the interrupt process routine. In other words, the multi-task control element 1 returns to the main routine and enters stand-by status for receiving the next command, while the CPU 2 continues the execution of a specific task being executed according to the time-sharing process designated. After the registered time is past, the system causes the task control block TCB of the task under execution to be connected to the rear end of "ready" Q, resetting flag RUN and setting flag READY (step 109), and finally calls up the task switching routine shown in FIG. 22 (step 110).

Referring now to the flowchart shown in FIG. 22, as soon as the operation time of a task designated by the time-sharing process is past, the step skips from step 95 to step 99, and then the system executes operations corresponding to step 99 through step 103. These operations first allow data stored in the old stack pointer register SPB to be transferred to the area (h) of the task stack pointer of the task executed last for storage (step 99), and then cause the task control block TCB of a task having the identical priority to that designated by the time-sharing process to be separated from "ready" Q (step 100). Then, the data in the area (h) of the task stack pointer in the task control block TCB is written into the new stack pointer register SPN (step 101), and finally flag RUN is set to the task status (a) (step 102). After these task switching routine operations are completed, the step returns from the interrupt routines. As a result of these operations executed by the multi-task control element 1, the CPU 2 now executes other tasks that specifically require the time-sharing process routine. As described above, the multi-task control element 1 as the preferred embodiment of the present invention can simultaneously support a maximum of 8 tasks. If it is necessary to support more than 8 tasks, tasks can be either generated, erased, or replaced as required by effectively operating the command 2 (generates tasks) and command 3 (erases tasks). The multi-task control element 1 provides each task with the right of occupying the CPU 2 according to the priority orders given to them. By activating the command 7 (provides tasks with the time-sharing process), a plurality of tasks each having the identical priority order can also be properly scheduled by the time-sharing process. Normally, the priority orders for tasks are provided when tasks are generated. However, the priority order can be modified even when the CPU 2 executes programs by effectively operating the command 6 that specifically changes the priority orders given to tasks. When the time-sharing process starts, execution of tasks is done in order of the task generation by either the command 0 (provides the initialization) or by command 2 (generates tasks). If the command 7 is activated to have a specific task enter the time-sharing process while it is being executed, and also if the priority orders between the executed task and the time-sharing designation are found identical to each other, the time-sharing process is entitled with the preference to the other effective from the start of its execution. By effectively operating the command 12 (transmits message) and command 13 (receives message), any data (message) can be exchanged between tasks through the mail box MBX of the multi-task control element 1.

When the command 12 is executed, if any specific task holding the priority higher than that of the executed task remains in the stand-by status after executing the command 13, by activating the task switching operation, the task in the stand-by mode then starts execution. If any task having a lower priority order is held in stand-by mode by the command 13, this task can only enter the "ready" status, whereas such a task that actually executed the command 12 will continue the execution mode. When executing the command 12, unless the command 13 has been executed, data (message) will be held by the mail box MBX, allowing the task to continue the execution.

After executing the command 13, if a data (message) has already been received by the designated mail box MBX, the task can immediately read the received data (message) through the command parameter register CPIO. By applying the standby function of command 13, not only the data exchange between tasks, but also synchronization and mutual elimination can be achieved. When synchronizing and/or mutually eliminating tasks, dummy data is written into the mail box MBX, which may not be applied to the actual task processing operation.

Depending on the process convenience, it may be necessary to control the sequence of executing two tasks. For example, if one of the designated tasks should be held waiting until the other task completes its process routine, these two task can be synchronized with each other by effectively using commands 12 and 13 as shown in the flowcharts below.

| Task 1 | Task 2 |
|---|---|
| | (1) Executes the command 13 |
| (2) Executes Process I | Stands by |
| (3) Executes the command 12 | |
| | (4) Executes Process II |

(1) Task 2 executes the command 13. However, since the needed message has not yet arrived, the task 2 then enters "Stand-by" status.
(2) Task 1 executes Process I earlier than Process II to be done by task 2.
(3) Task 1 executes the command 12. The system then approves task 2 to execute Process II.
(4) Task 2 executes Process II.

Referring now to the function for executing mutual elimination, it may be necessary to inhibit a plurality of tasks from simultaneously using a common element, for example, I/O and/or memory. Typically, when inhibiting tasks from simultaneously using a printer, the act of "mutual elimination" can be executed as shown below.

| Task 1 | Task 2 |
|---|---|
| (1) Executes the command 12 | |
| (2) Executes the command 13 | |
| | (3) Executes the command 13 |
| (4) Uses a printer | Stands by |
| (5) Executes the command 12 | |
| | (6) Uses the printer shown in (4) |
| | (7) Executes the command 12 |

(1) Task 1 executes the command 12.
(2) Task 1 executes the command 13. Since it has already executed the command 12, it doesn't enter "Stand-by" status, but locks the "mutual elimination".
(3) Task 2 executes the command 13, which causes Task 2 to enter "Stand-by" status.
(4) Task 1 uses the printer.
(5) Task 1 executes the command 12. This unlocks the "mutual elimination".

As described above, the multi-task control element 1 can effectively realize synchronization and mutual elimination between tasks.

The multi-task control element 1 reflecting the preferred embodiment of the present invention integrates hardware on an LSI unit, however, it is also possible to make up any device by incorporating circuit elements as required.

What is claimed is:

1. A multi-task control device for a computer system in which a single central processor is used and said multi-task control device is connected to said single central processor via a bus, said multi-task control device controlling a plurality of tasks to be executed by said single central processor, comprising:
- a plurality of task control block memory areas for storing data related to each of said plurality of tasks, said data including a priority order, a memory address, and the status of a task;
- means for selectively receiving commands for the controlling of a plurality of tasks to be executed from said single central processor; and
- control means, responsive to said commands for the controlling of a plurality of tasks from said means for receiving, for comparing the priority orders of said tasks to be executed stored in said task control block memory areas;
- said control means arraying said tasks to be executed in the order of their respective priorities;
- said control means generating an interrupt signal to said central processor for the execution of a task with highest priority;
- said control means conducting a time-sharing process for the execution of a number of tasks having equivalent priority orders;
- said control means suspending the execution of a task when necessary for the execution of an external event;
- said control means reactivating the execution of a suspended task upon completion of said external event;
- said control means changing the priority order of a task in its corresponding task control block memory area;
- said control means clearing the task control block memory area of a task to be deleted;
- said control means specifying a task control block memory area of a task to be generated; and
- said multi-task control device being provided as a peripheral device of said computer system.

2. The device of claim 1, further comprising:
timer means for internally generating an interrupt signal in the operation of said time-sharing process.

3. The device of claim 1, further comprising:
buffer memory means for allowing the exchange of data between various tasks.

* * * * *